(12) United States Patent
Hayaishi

(10) Patent No.: US 7,702,148 B2
(45) Date of Patent: Apr. 20, 2010

(54) COLOR BALANCE CORRECTION BASED ON COLOR CAST ATTRIBUTE

(75) Inventor: Ikuo Hayaishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1039 days.

(21) Appl. No.: 11/376,950

(22) Filed: Mar. 15, 2006

(65) Prior Publication Data

US 2006/0222242 A1 Oct. 5, 2006

(30) Foreign Application Priority Data

Mar. 16, 2005 (JP) .............................. 2005-074323

(51) Int. Cl.
*G06K 9/00* (2006.01)
(52) U.S. Cl. ..................................................... 382/167
(58) Field of Classification Search ........................ None
See application file for complete search history.

(56) References Cited

U.S. PATENT DOCUMENTS

| | | | | |
|---|---|---|---|---|
| 5,384,601 | A * | 1/1995 | Yamashita et al. | 348/577 |
| 6,975,759 | B2 * | 12/2005 | Lin | 382/167 |
| 7,072,074 | B2 * | 7/2006 | Kuwata et al. | 358/1.9 |
| 7,227,552 | B1 * | 6/2007 | Saito | 345/589 |
| 7,366,350 | B2 * | 4/2008 | Kajihara | 382/167 |
| 7,450,753 | B2 * | 11/2008 | Hayaishi | 382/167 |
| 2004/0091150 | A1 * | 5/2004 | Kuwahara et al. | 382/167 |
| 2004/0156544 | A1 * | 8/2004 | Kajihara | 382/167 |
| 2004/0208363 | A1 * | 10/2004 | Berge et al. | 382/167 |

FOREIGN PATENT DOCUMENTS

| | | |
|---|---|---|
| JP | 2001-320727 | 11/2001 |
| JP | 2002-044469 | 2/2002 |

OTHER PUBLICATIONS

Abstract of Japanese Patent Publication No. 2001-320727, Pub. Date: Nov. 16, 2001, Patent Abstracts of Japan.
Abstract of Japanese Patent Publication No. 2002-044469, Pub. Date: Feb. 8, 2002, Patent Abstracts of Japan.

* cited by examiner

*Primary Examiner*—Yuzhen Ge
(74) *Attorney, Agent, or Firm*—Martine Penilla & Gencarella, LLP

(57) ABSTRACT

An image processing apparatus executes color balance correction of an image composed of multiple pixels. The image processing apparatus comprises a representative value calculation unit and a correction processor. The representative value calculation unit calculates, based on signal values of the pixels included in a skin tone area that includes pixels indicating human skin within the image, a representative value representing hue and chroma of the pixels included in the skin tone area. The correction processor executes color balance correction of the image using execution correction amount set based on normal correction amount obtained by multiplying a difference between the representative value and an ideal value designated as a value representing ideal hue and chroma of human skin by a reduction coefficient. The value of the reduction coefficient is set such that the value of the reduction coefficient can vary in response to the representative value.

3 Claims, 8 Drawing Sheets

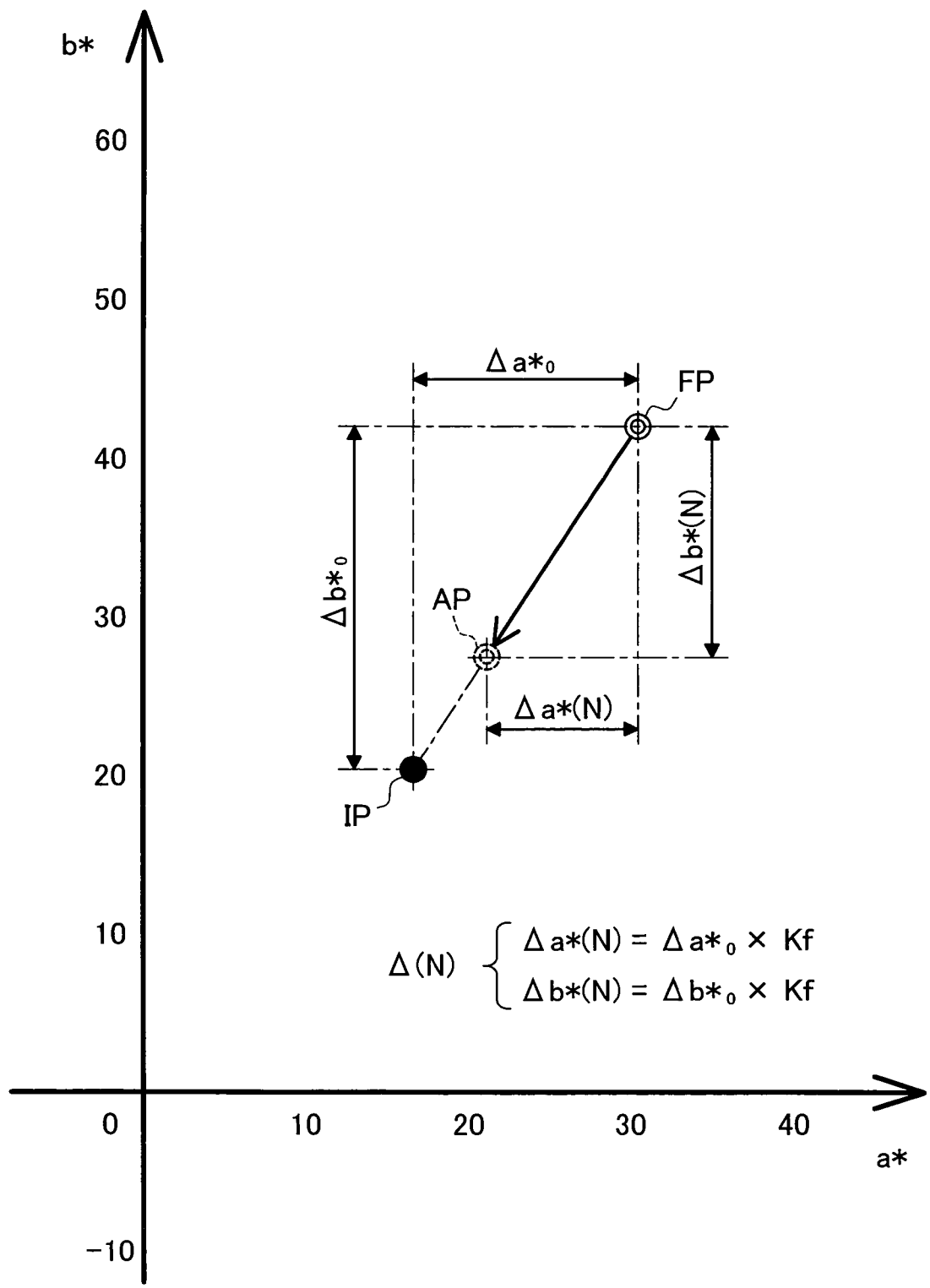

COLOR BALANCE CORRECTION BASED ON COLOR CAST ATTRIBUTE

CROSS REFERENCE TO RELATED APPLICATIONS

The present application claims the priority based on Japanese Patent Application No. 2005-74323 filed on Mar. 16, 2005, the disclosure of which is hereby incorporated herein by reference in its entirety.

BACKGROUND

1. Technical Field

The present invention relates to color balance correction of an image, and more particularly relates to a technology for carrying out desirable color balance correction in response to an attribute of color cast occurring in an image.

2. Description of the Related Art

Where an image is generated through photographing using a digital still camera for example, color cast can occur in which the overall image is affected by a particular color depending on the light source. Generally, color balance correction is performed in order to correct for color cast in an image.

In connection with color balance correction of an image, a technology whereby correction is carried out to ensure that the natural color of human skin is reproduced and that the image as a whole has desirable color balance is described in JP2002-44469A, for example. In this technology, when color balance correction is carried out, correction amounts that ensure that the human skin color expressed in the image will be reproduced with the ideal color for human skin is not used, but rather, correction amounts calculated by multiplying the difference between the skin color expressed in the image and an ideal color by a certain reduction coefficient is used. Using this type of correction, the skin color expressed in the image is corrected such that the skin color will approach the ideal color, and because reduced correction amounts are used, desirable color balance is maintained throughout the entire image.

With regard to color cast occurring in an image, attributes such as an attribute of color regarding which such effect appears and an attribute of degree to which it appears vary depending on the photographing conditions, such as the type of light source. The impressions conveyed to an observer from color cast in an image may vary based on the differences in these attributes. For example, color cast in the green direction that often occurs when photographing is performed under fluorescent light may convey a highly unnatural impression to an observer. On the other hand, the color cast in the orange direction that often occurs when photographing is performed under incandescent light may not convey such a highly unnatural impression. Consequently, the preferred value for the aforementioned reduction coefficient used when performing color balance correction, i.e., the proportion of the correction amount to the difference between the skin color appearing in the image and the ideal color, may vary depending on the attributes of color cast described above.

However, in the above prior art technology, the proportion of the correction amount to the difference between the skin color appearing in the image and the ideal color is fixed, irrespective of the actual color cast attributes. Therefore, it is difficult to perform desirable color balance correction in accordance with the color cast attributes actually observed.

This problem is not limited to images generated using a digital still camera, and is a problem that arises whenever color balance correction of an image is performed.

SUMMARY

An object of the present invention is to provide a technology that enables desirable balance correction to be carried out in accordance with color cast attributes.

In one aspect of the present invention, there is provided an image processing apparatus for executing color balance correction of an image composed of multiple pixels. The image processing apparatus comprises a representative value calculation unit and a correction processor. The representative value calculation unit calculates, based on signal values of the pixels included in a skin tone area that includes pixels indicating human skin within the image, a representative value representing hue and chroma of the pixels included in the skin tone area. The correction processor executes color balance correction of the image using execution correction amount set based on normal correction amount obtained by multiplying a difference between the representative value and an ideal value designated as a value representing ideal hue and chroma of human skin by a reduction coefficient. The value of the reduction coefficient is set such that the value of the reduction coefficient can vary in response to the representative value.

With this image processing apparatus, the value of the reduction coefficient indicating the proportion of the normal correction amount to the difference between a representative value that represents the hue and chroma of the pixels included in the skin tone area and ideal value designated as a value set representing the ideal hue and chroma of human skin is set such that it can vary in response to the representative value. Furthermore, this image processing apparatus performs correction using execution correction amount set based on the normal correction amount. Consequently, this image processing apparatus enables desirable color balance correction to be performed in accordance with color cast attributes.

The present invention can be realized in various aspects. For example, the present invention can be realized in aspects such as an image processing method and associated apparatus, an image correction method and associated apparatus, an image conversion method and associated apparatus, a computer program that executes the functions of these methods and apparatuses, a recording medium on which such computer program is recorded, or a data signal encoded in a carrier wave that incorporates this computer program.

These and other objects, features, aspects, and advantages of the present invention will become more apparent from the following detailed description of the preferred embodiments with the accompanying drawings.

BRIEF DESCRIPTION OF THE DRAWINGS

FIG. 3 is a diagram showing the basic outline of the method for calculating the normal correction amount $\Delta(N)$;

DESCRIPTION OF THE PREFERRED EMBODIMENT

Next, aspects of the present invention will be described in the following order on the basis of embodiment:
A. Embodiment
B. Variations

A. Embodiment

Figure 1:
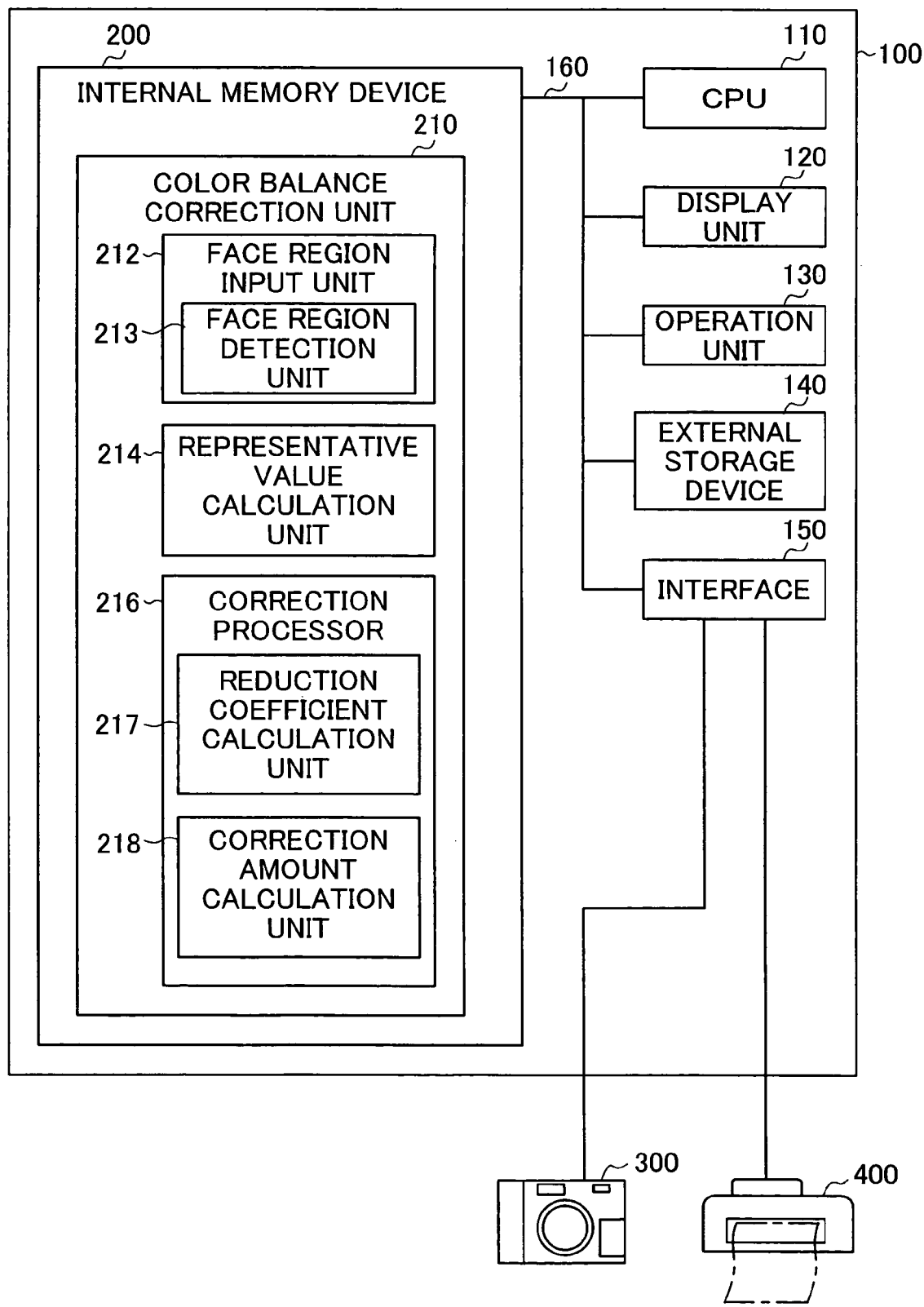
FIG. 1 is a diagram showing the construction of an image processing apparatus as an embodiment of the present invention.

FIG. 1 is a diagram showing the construction of an image processing apparatus as an embodiment of the present invention. The image processing apparatus 100 of this embodiment is constructed using a computer and includes a CPU 110, a display unit 120 such as a monitor or the like, an operation unit 130 such as a keyboard and a mouse or the like, an external storage device 140 such as a hard disk drive or the like, an interface 150 and an internal memory device 200 such as a ROM or a RAM. The various constituent elements of the image processing apparatus 100 are interconnected by a bus 160.

The interface 150 includes a plurality of I/O terminals, and executes information exchange with external devices. For example, the interface 150 is connected to a digital still camera 300 via a cable, and reads the image data recorded on the digital still camera 300. The interface 150 is also connected to a printer 400 via a cable, and supplies to the printer 400 the print data used for printing of the image.

A color balance correction unit 210 is stored on the internal memory device 200. The color balance correction unit 210 is a computer program that executes processing to correct the color balance of an image under the control of a prescribed operating system. The CPU 110 executes this color balance correction processing by reading out this program from the internal memory device 200 and executing the program.

The color balance correction unit 210 includes as modules a face region input unit 212, a representative value calculation unit 214 and a correction processor 216. The correction processor 216 includes as modules a reduction coefficient calculation unit 217 and a correction amount calculation unit 218. The face region input unit 212 may include as a module a face region detection unit 213. The functions of these various units are described in detail below in connection with the description of the color balance correction process.

Figure 2:
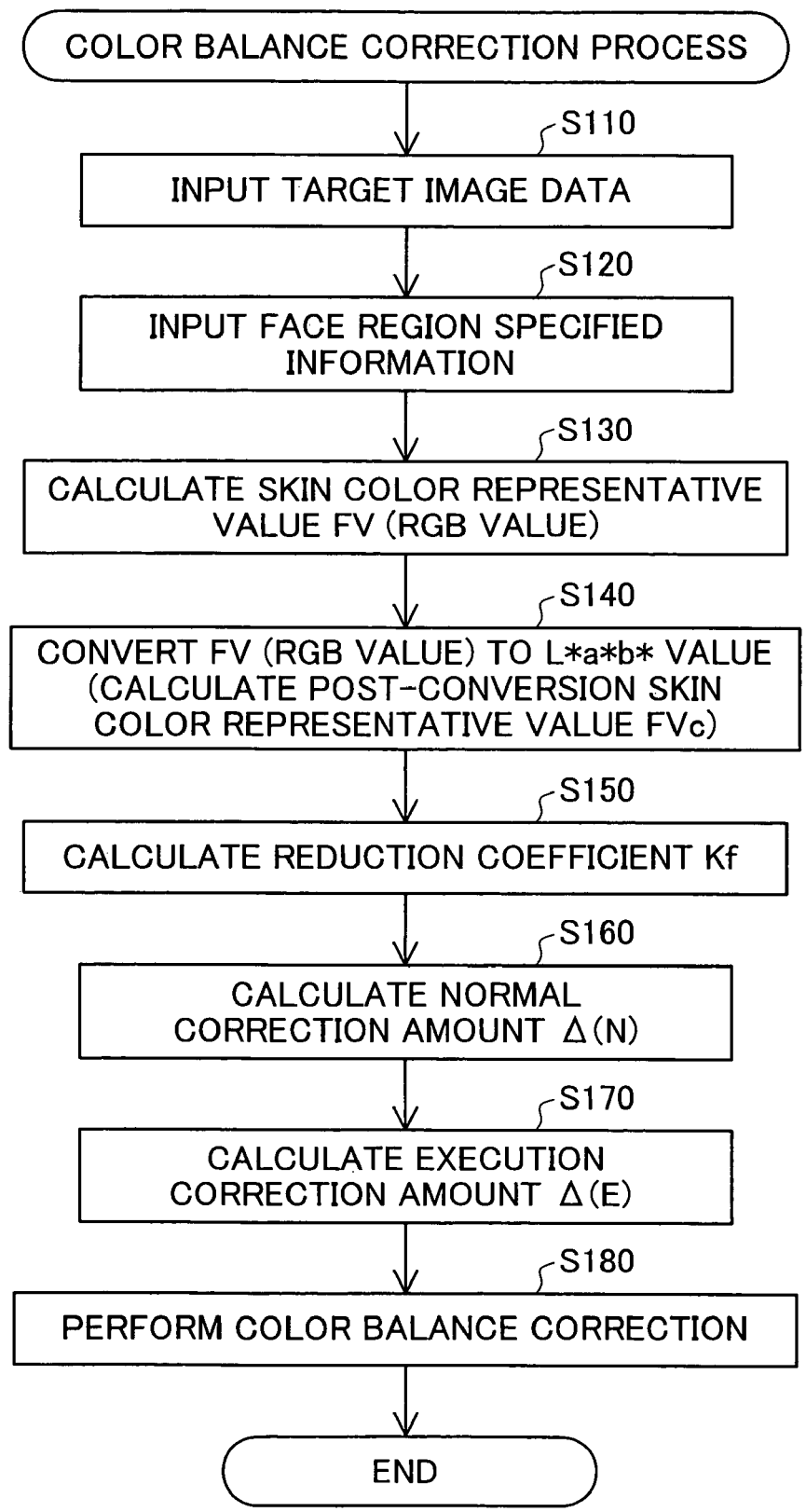
FIG. 2 is a flowchart showing the sequence of operations of the color balance correction process executed by the image processing apparatus 100 of the embodiment.

FIG. 2 is a flowchart showing the sequence of operations of the color balance correction process executed by the image processing apparatus 100 of the embodiment. The color balance correction process of the embodiment is a process that correction amount is calculated in accordance with the color cast attributes estimated from the human skin color expressed in the image and color balance correction is executed using the correction amount.

In step S110, the color balance correction unit 210 (FIG. 1) inputs a target image data as a target of color balance correction. The target image data may be input from the digital still camera 300 (FIG. 1) or from the external storage device 140 (FIG. 1). The target image data may be input from a CD-R/RW drive (not shown) or other externally connected device or via the Internet. The input target image data is stored in a prescribed area of the internal memory device 200. In this embodiment, the target image data is input as RGB data, but the target image data may be input as data expressed in a different color space.

In step S120 (FIG. 2), the face region input unit 212 (FIG. 1) inputs information that specifies a face region in the target image expressed by the input target image data. Here, a face region refers to a region within the target image that expresses a human face. Information that specifies a face region refers to information used to specify pixels included in a face region in the target image, and comprises, for example, information indicating the positions of such pixels. The information specifying a face region may be input by the user performing an operation to specify the face region on the target image displayed on the display unit 120 (FIG. 1), for example. Alternatively, such information may be input by the face region detection unit 213 (FIG. 1) included in the face region input unit 212 using a heretofore known face region detection method (such as the method described in JP2001-16573A, for example).

In step S130 (FIG. 2), the representative value calculation unit 214 (FIG. 1) identifies the face region within the target image and calculates the skin color representative value FV from the image data for the face region. Here, the skin color representative value FV refers to a value that represents the human skin color expressed in the target image. In this embodiment, an RGB value set calculated by averaging the pixel values (RGB values) of all pixels included in the face region of the target image for each of the R, G and B values is used as the skin color representative value FV. Various types of other indices may be used for the skin color representative value FV. The skin color representative value FV may be defined as the peak values of the histograms for the R, G and B values of the pixel values for all pixels included in the face region of the target image, or may be defined as the median values of such histograms.

In step S140 (FIG. 2), the representative value calculation unit 214 (FIG. 1) converts the skin color representative value FV calculated as an RGB value set into a L*a*b* value set to calculate the post-conversion skin color representative value FVc. The a* and b* values of this post-conversion skin color representative value FVc as a L*a*b* value set are values that represent the hue and chroma of the human skin color expressed in the target image. This post-conversion skin color representative value FVc is used as an index to express the color cast attributes of the target image in view of the relationship between the FVc value and the ideal skin color values described below.

In step S150 (FIG. 2), the reduction coefficient calculation unit 217 (FIG. 1) of the correction processor 216 calculates the reduction coefficient Kf based on the post-conversion skin color representative value FVc. As described below, the reduction coefficient Kf represents the proportion of correction amount to the difference between the human skin color expressed in the target image and the ideal skin color, and is set to have various values within the range of 0-0.8. The method used to calculate the reduction coefficient Kf is described in detail below.

In step S160 (FIG. 2), the correction amount calculation unit 218 (FIG. 1) of the correction processor 216 calculates the normal correction amount Δ(N). FIG. 3 is a diagram showing the basic outline of the method for calculating the normal correction amount Δ(N). FIG. 3 shows a skin color representative point FP and an ideal point IP that are plotted on the a*-b* plane, which is a plane that represents hue and chroma. Here, the skin color representative point FP refers to a point that represents the position on the a*-b* plane of the post-conversion skin color representative value FVc described above. The ideal point IP refers to a point that represents the position on the a*-b* plane of the ideal value of hue and chroma of human skin color. In this embodiment, the normal correction amount Δ(N) is defined as a combination of the normal correction amount Δa*(N) in the a* direction on the a*-b* plane and the normal correction amount Δb*(N) in the b* direction. As shown in FIG. 3, the normal correction amounts Δ(N) (i.e., the combination of Δa*(N) and Δb*(N)) are calculated by multiplying the differences (expressed as 'Δa*$_0$' and 'Δb*$_0$') between the respective values expressing the skin color representative point FP (i.e., the a* value and b* value of the post-conversion skin color representative value FVc) and the values expressing the ideal point IP (i.e., the a* value and the b* value thereof) by the reduction coefficient Kf. That is, as described above, the reduction coefficient Kf is used as the proportion of the normal correction amounts Δ(N) (Δa*(N) and Δb*(N)) to the differences (Δa*$_0$ and Δb*$_0$) between the values representing the skin color representative point FP and the values representing the ideal point IP. The differences (Δa*$_0$ and Δb*$_0$) between the values for the skin color representative point FP and the ideal point IP form the distance between the skin color representative point FP and the ideal point IP on the a*-b* plane.

The position of the ideal point IP is set to reflect the results of a survey of user preferences. The position of the ideal point IP may be changed by the user.

The normal correction amounts Δ(N) calculated in this fashion are the correction amounts that will render a pixel having the values of the skin color representative point FP to be corrected to become a pixel having the values of a point AP that exists on the line segment connecting the skin color representative point FP and the ideal point IP and at which the distance from the skin color representative point FP comprises the length of the above line segment multiplied by the reduction coefficient Kf. That is, as the value of the reduction coefficient Kf increases, the normal correction amounts Δ(N) approach a correction amounts that render a pixel having the values of the skin color representative point FP into a pixel having values that are close to those of the ideal point IP.

Figure 4A:
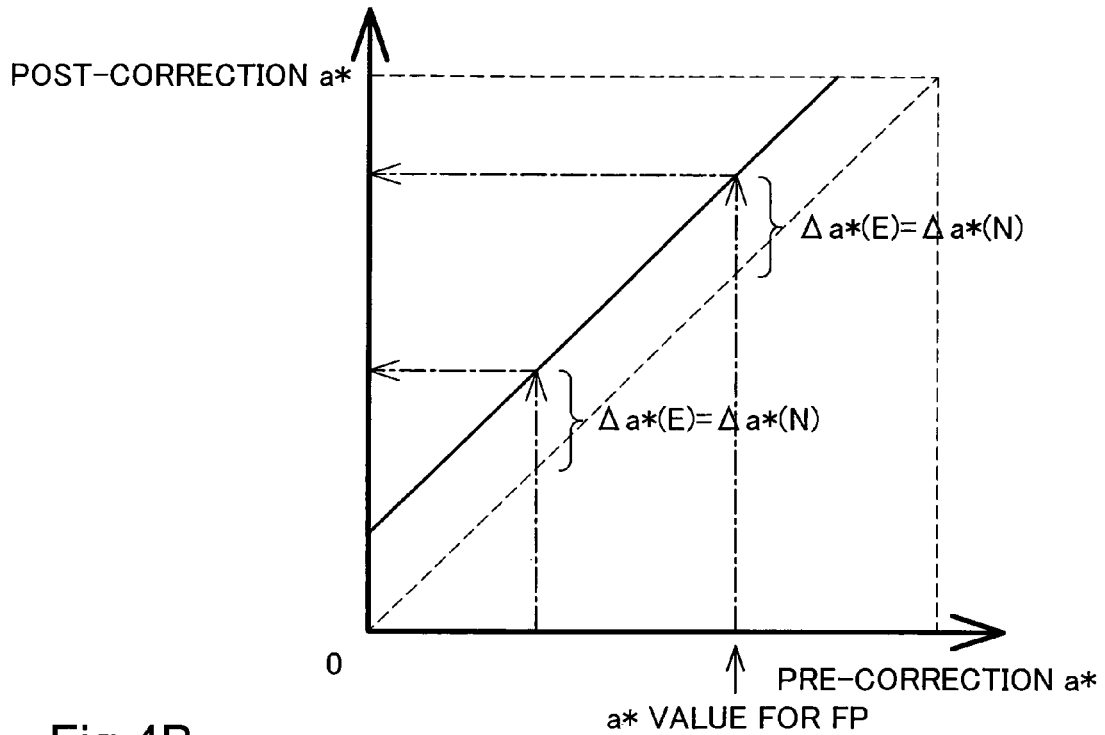
FIGS. 4A and 4B are diagrams showing examples of the method for setting the execution correction amounts $\Delta(E)$.
Figure 4B:
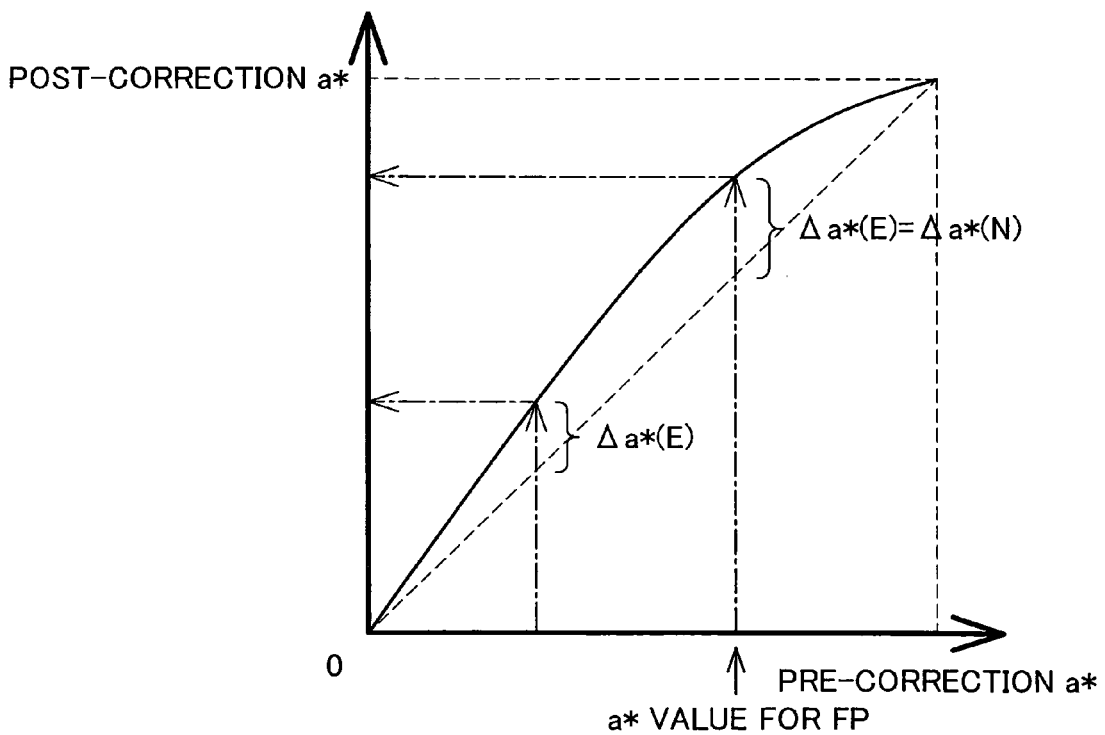

In step S170 (FIG. 2), the correction amount calculation unit 218 (FIG. 1) sets the execution correction amounts Δ(E) based on the normal correction amounts Δ(N). The execution correction amounts Δ(E) refer to the correction amounts actually used when color balance correction is performed to all pixels in the target image. FIGS. 4A and 4B are diagrams showing examples of the method for setting the execution correction amounts Δ(E). FIGS. 4A and 4B show the method for setting the a*-direction execution correction amount Δa*(E) among the execution correction amounts Δ(E). As shown in FIG. 4A, the execution correction amount Δa*(E) may be uniformly set to the same value as the normal correction amount Δa*(N), regardless of the pre-correction a* value. Alternatively, as shown in FIG. 4B, the execution correction amount Δa*(E) corresponding to the a* value of the skin color representative point FP may be made identical to the normal correction amount Δa*(N) and the execution correction amount Δa*(E) corresponding to other a* values may be set via curve (for example, spline curve) interpolation using the points exhibiting the largest and smallest a* values. The same setting method may be used for the execution correction amount Δb*(E) in the b* direction. As long as the execution correction amounts Δ(E) are set based on the normal correction amounts Δ(N), various other setting methods may be used.

In step S180 (FIG. 2), the correction processor 216 (FIG. 1) performs color balance correction of the target image using the execution correction amounts Δ(E). Specifically, for each pixel composing the target image, the RGB values are converted into L*a*b* values, correction is carried out using the execution correction amounts Δ(E) (i.e., Δa*(E) and Δb*(E)) for the a* and b* values of the post-conversion L*a*b* values, and conversion from the post-correction L*a*b* values to RGB values is performed, whereupon post-conversion image data is calculated. For example, where the execution correction amounts Δ(E) are set using the method shown in FIG. 4A, color balance correction is carried out such that the positions of all pixels composing the target image on the a*-b* plane are shifted in a parallel fashion by the normal correction amounts Δ(N). Alternatively, where the execution correction amounts Δ(E) are set using the method shown in FIG. 4B, those pixels in the target image having the same a* value (or b* value) as the skin color representative point FP have their positions on the a*-b* plane shifted in a parallel fashion by the normal correction amounts Δ(N), while the other pixels are shifted in a parallel fashion by the execution correction amounts Δ(E) set for each pixel.

Through the above processing, color balance correction of the target image is carried out using the execution correction amounts Δ(E) set based on the normal correction amounts Δ(N) derived by multiplying the differences between the values of the skin color representative point FP and of the ideal point IP by the reduction coefficient Kf.

Figure 5:
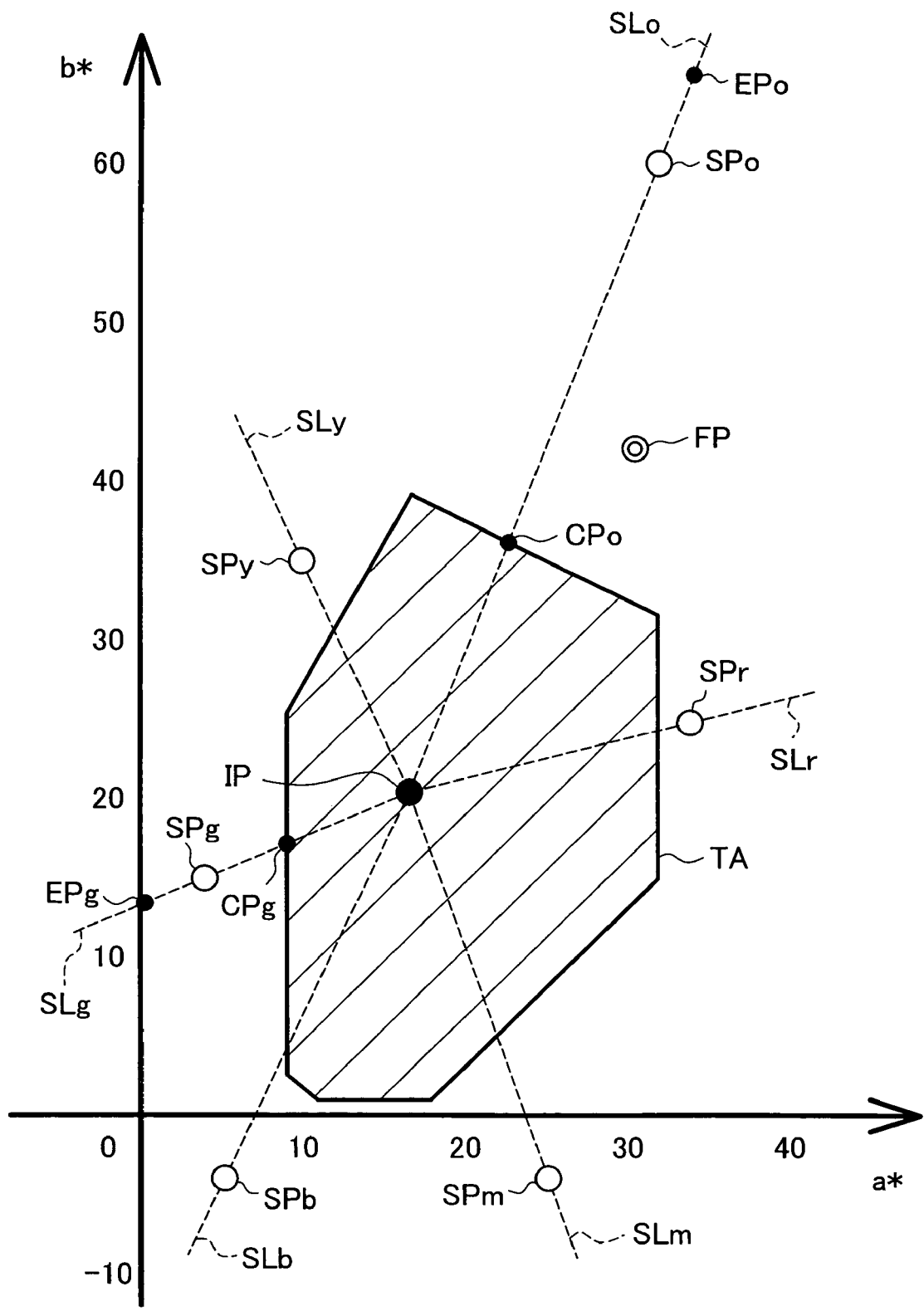
FIG. 5 is a diagram showing an example of the reference lines SL on the a*-b* plane.

The method by which the reduction coefficient Kf is calculated will now be described. In this embodiment, the reduction coefficient Kf is calculated using reference reduction coefficients Ks set along a plurality of reference lines SL on the a*-b* plane. FIG. 5 is a diagram showing an example of the reference lines SL on the a*-b* plane. Here, a reference line SL refers to a line indicating the direction of color cast as a reference, and is a straight line connecting the ideal point IP and a reference color cast point SP. A reference color cast point SP refers to a point on the a*-b* plane where it is assumed that a pixel expressing human skin in the image will be positioned when a prescribed color cast occurs in an image captured under a prescribed reference light source. In this embodiment, as shown in FIG. 5, six reference color cast points SP corresponding to six reference light sources are set. Specifically, a yellow reference color cast point SPy corresponding to a yellow light source, an orange reference color cast point SPo corresponding to an orange light source, a red reference color cast point SPr corresponding to a red light source, a magenta reference color cast point SPm corresponding to a magenta light source, a blue reference color cast point SPb corresponding to a blue light source and a green reference color cast point SPg corresponding to a green light source are used. Six reference lines SL (i.e., SLy, SLo, SLr, SLm, SLb and SLg) corresponding to these six reference color cast points SP are set.

Furthermore, as shown in FIG. 5, a target area TA (indicated by hatch lines in FIG. 5) that is a region in the a*-b* plane in which the human skin color expressed in the image is preferably positioned is set in the a*-b* plane.

Figure 6A:
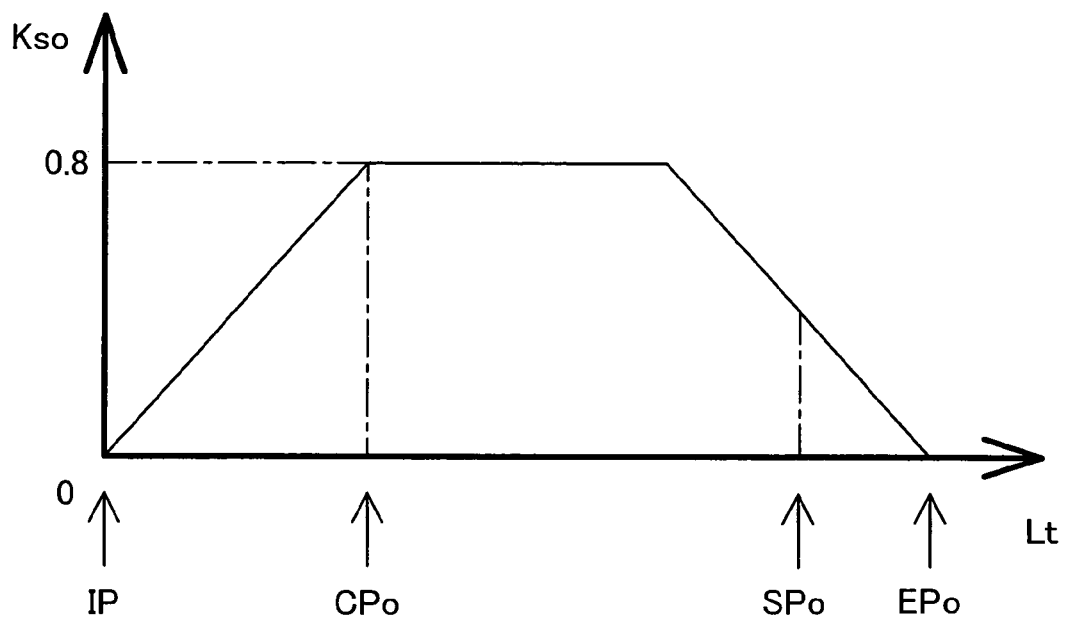
FIGS. 6A and 6B are diagrams showing examples of a reference reduction coefficient Ks.
Figure 6B:
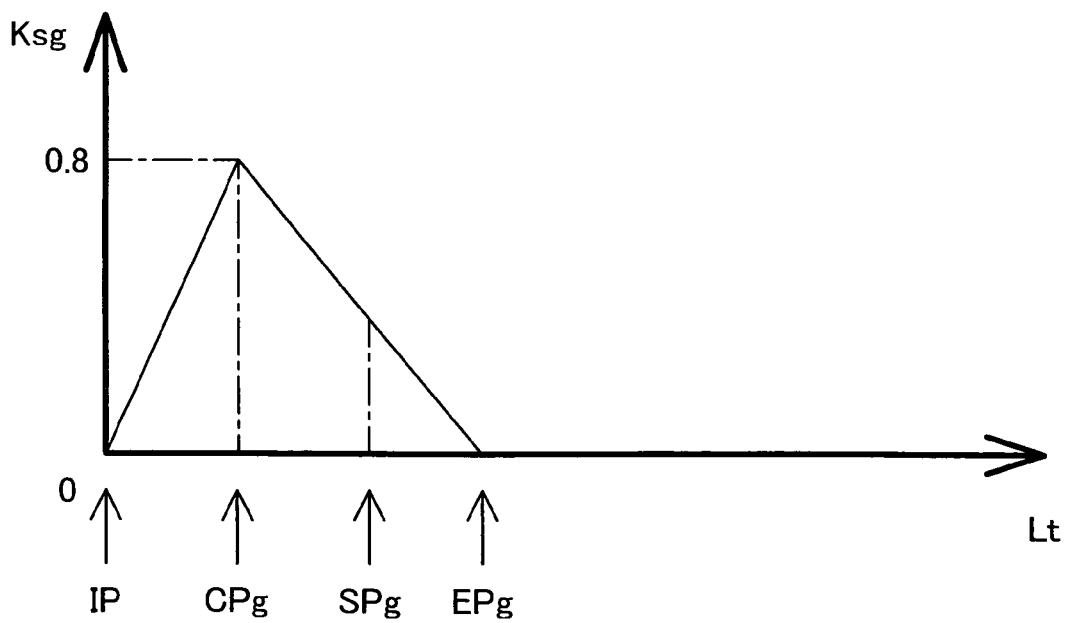

The reference reduction coefficient Ks is set on each reference line SL. FIGS. 6A and 6B are diagrams showing examples of a reference reduction coefficient Ks. The reference reduction coefficient Ks refers to a reduction coefficient as a reference that is set on a reference line SL indicating a direction of color cast corresponding to a reference light source, in accordance with the distance from the ideal point IP indicating the degree of color cast. In this embodiment, six reference reduction coefficients Ks are set on the six reference lines SL. FIG. 6A shows an example of the reference reduction coefficient Kso that resides on the orange reference line SLo (FIG. 5), while FIG. 6B shows an example of the reference reduction coefficient Ksg that resides on the green reference line SLg (FIG. 5). In FIGS. 6A and 6B, Lt indicates the distance from the ideal point IP.

For example, the value of the reference reduction coefficient Kso shown in FIG. 6A that resides on the orange reference line SLo increases as the distance Lt increases from 0, and becomes the maximum value of 0.8 at the point CPo (see FIG. 5) on the boundary line of the target area TA. As the distance Lt further increases, the value of the reference reduction coefficient Kso is maintained at the maximum value for a period of time before it declines. At the limiting point EPo at which the distance Lt is greater than the distance to the reference color cast point SPo (see FIG. 5), the value of the reference reduction coefficient Kso becomes 0.

The value of the reference reduction coefficient Ksg residing on the green reference line SLg shown in FIG. 6B increases as the distance Lt increases from 0, and becomes the maximum of 0.8 at the point CPg (see FIG. 5) on the boundary line of the target area TA. Beyond this point, the value of the reference reduction coefficient Ksg decreases as the distance Lt increases. At the limiting point EPg at which the distance Lt is greater than the distance Lt at the reference color cast point SPg, the value of the reference reduction coefficient Ksg becomes 0.

As described above, in this embodiment, each reference reduction coefficient Ks is set such that its value varies based on the distance from the ideal point IP, even along a single reference line SL. In other words, the value of the reference reduction coefficient Ks is set such that it varies depending on the degree of color cast even if the color cast travels in the same direction.

Furthermore, because the value of each reference reduction coefficient Ks is set independently, the properties of the reference reduction coefficient Ks may be changed for each reference line SL, as shown in FIGS. 6A and 6B. Specifically, within the target area TA (FIG. 5), even if the distance Lt from the ideal point IP is identical, the value of the reference reduction coefficient Kso on the orange reference line SLo is set to be smaller than the value of the reference reduction coefficient Ksg on the green reference line SLg. This is because color cast in the direction of the orange reference line SLo does not require as much correction as color cast in the direction of the green reference line SLg. In this way, in the present embodiment, the values of the reference reduction coefficients Ks vary in accordance with the direction of color cast even where the degree of color cast is the same.

Furthermore, the distance from the ideal point IP to the limiting point EP is set to be larger in the case of the limiting point EPo on the orange reference line SLo than in the case of the limiting point EPg on the reference line SLg. This is because the likelihood of erroneously detecting a non-human skin pixel as belonging to a face region is higher for a pixel residing on the orange reference line SLo traveling from the ideal point IP than for a pixel residing on the green reference line SLg.

In this embodiment, the reference reduction coefficients Ks for red and magenta are set such that they have the same properties as the orange reference reduction coefficient Kso. On the other hand, the reference reduction coefficients Ks for blue and yellow are set such that they have the same properties as the green reference reduction coefficient Ksg.

The reference reduction coefficients Ks may be set to have various properties, depending on user preference. It is possible to offer a plurality of reference reduction coefficients Ks for each color cast direction having different properties such that the user may select a particular reference reduction coefficient Ks to be used. The reference reduction coefficients Ks are stored in a prescribed area of the internal memory device 200 (FIG. 1) in the form of a table.

Figure 7:
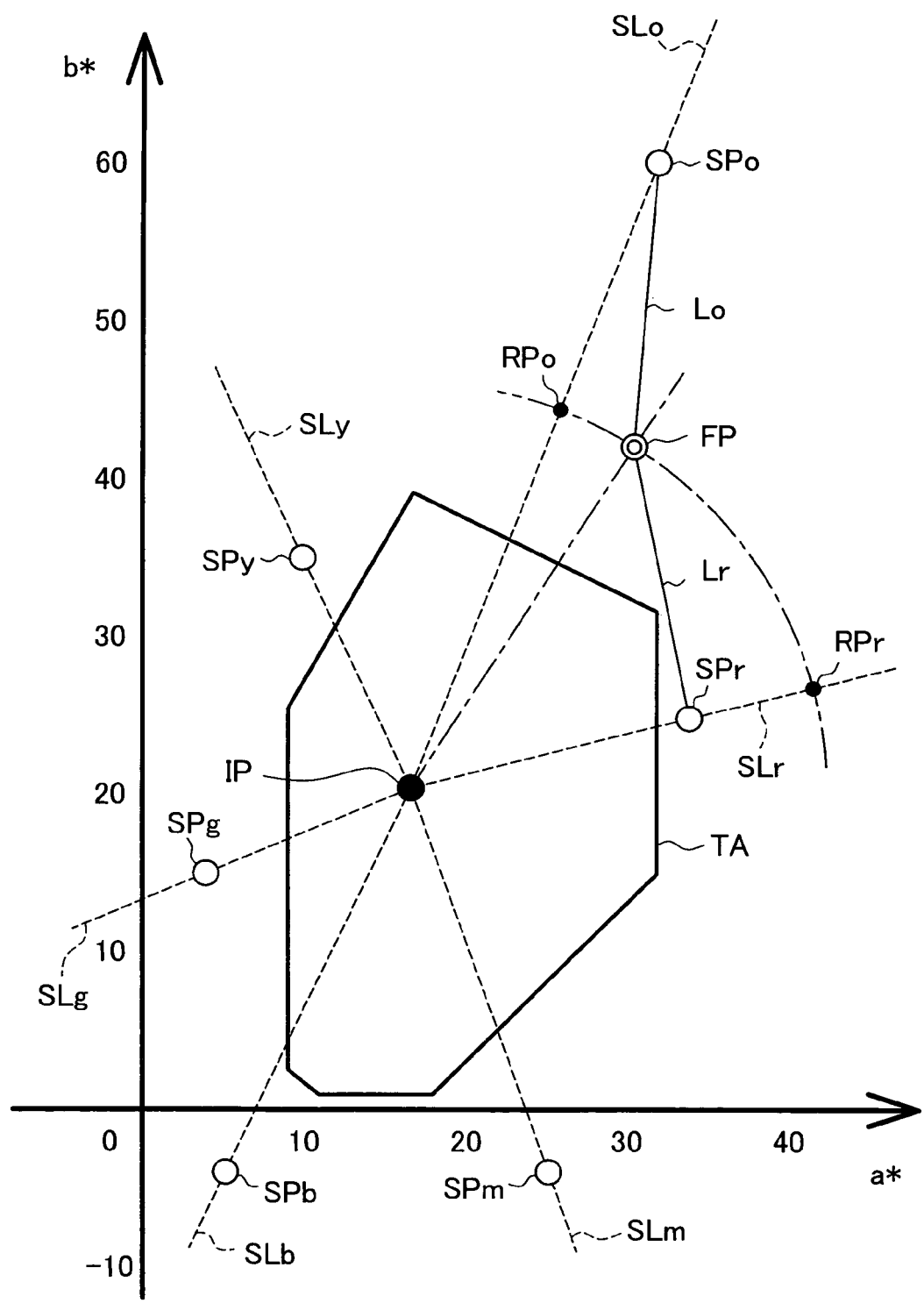
FIG. 7 is a diagram showing an example of the method for calculating the reduction coefficient Kf using the reference reduction coefficients Ks.

The reduction coefficient Kf is calculated using the reference reduction coefficients Ks described above. FIG. 7 is a diagram showing an example of the method for calculating the reduction coefficient Kf using the reference reduction coefficients Ks. If the skin color representative point FP is positioned on a reference line SL, the value of the reference reduction coefficient Ks corresponding to the position of the skin color representative point FP on this reference line SL becomes the reduction coefficient Kf. On the other hand, if the skin color representative point FP is not located on a reference line SL, the reduction coefficient Kf is calculated using two reference reduction coefficients Ks. These two reference reduction coefficients Ks are reference reduction coefficients Ks that reside on the two reference lines SL that are closest to the skin color representative point FP. In the example of FIG. 7, the two reference lines SL that are closest to the skin color representative point FP are the orange reference line SLo and the red reference line SLr. Consequently, the reference reduction coefficients Ks used for the calculation of the reduction coefficient Kf are the orange reference reduction coefficient Kso and the red reference reduction coefficient Ksr.

Figure 8A:
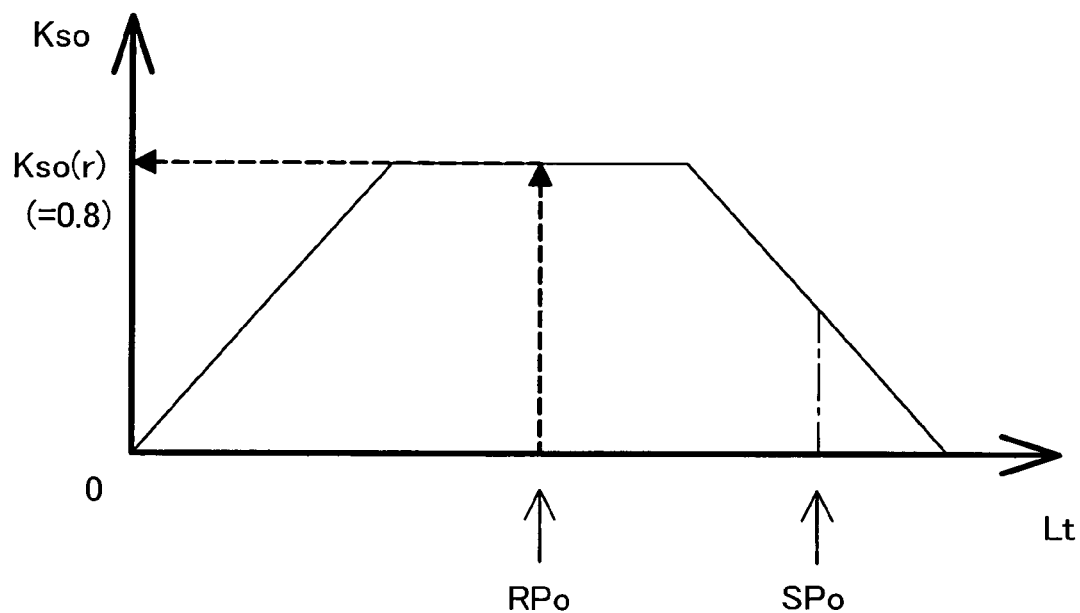
FIGS. 8A and 8B are diagrams showing examples of reference reduction coefficients Ks at adoption reference points RP.
Figure 8B:
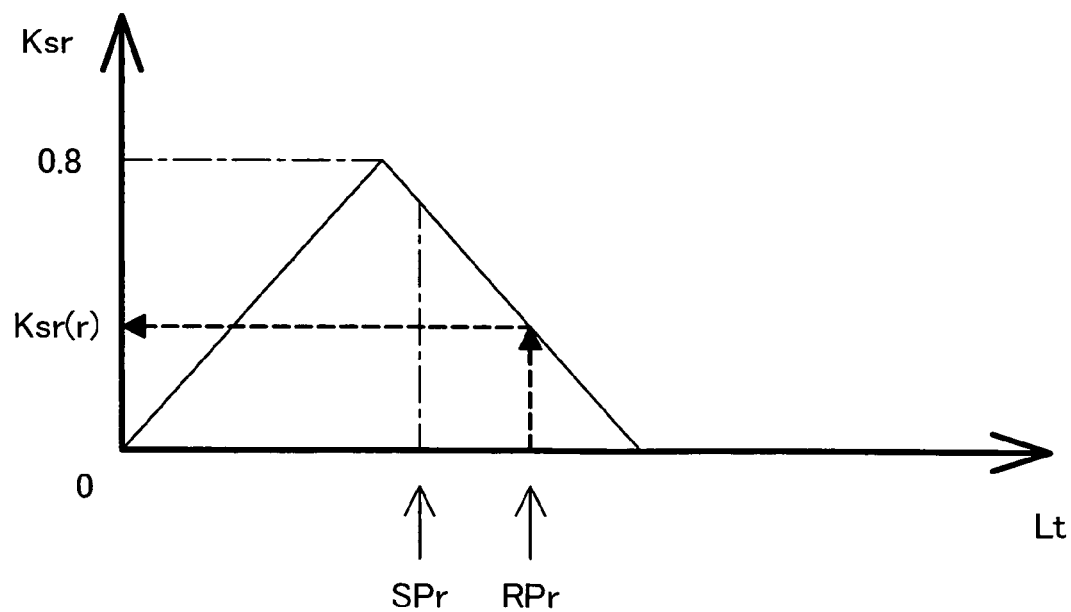

First, the reference reduction coefficients Ks at the points RP (hereinafter the 'adoption reference points RP') that are points on the two reference lines SL whose distances Lt from the ideal point IP are equal to the distance between the ideal point IP and the skin color representative point FP are calculated. FIG. 7 shows two adoption reference points (RPo and RPr) on two reference lines SL (SLo and SLr). FIGS. 8A and 8B are diagrams showing examples of reference reduction coefficients Ks at adoption reference points RP. FIG. 8A shows the reference reduction coefficient Kso(r) at the adoption reference point RPo on the orange reference line SLo, while FIG. 8B shows the reference reduction coefficient Ksr (r) at the adoption reference point RPr on the red reference line SLr.

The reduction coefficient Kf is calculated through weighted averaging of the reference reduction coefficients Ks at the two adoption reference points RP based on the distances between the reference color cast points SP corresponding these adoption reference points RP and the skin color representative point FP. As shown in FIG. 7, if the distance between the orange color cast point SPo and the skin color representative point FP is deemed Lo and the distance between the red color cast point SPr and the skin color representative point FP is deemed Lr, the reduction coefficient Kf is calculated based on the equation (1) below.

$$Kf = Kso(r) \times \frac{Lo}{Lo + Lr} + Ksr(r) \times \frac{Lr}{Lo + Lr} \qquad (1)$$

As described above, the reduction coefficient Kf is calculated using reference reduction coefficients Ks. In this embodiment, because the reduction coefficients Ks are set to values within the range of 0-0.8, the reduction coefficient Kf also falls within the range of 0-0.8.

In this embodiment, the value of the reduction coefficient Kf can be set to various values in accordance with the values of the skin color representative point FP (i.e., the a* value and b* value). Here, the values of the skin color representative point FP express the directional and quantitative attributes of the color cast in the target image. Consequently, the reduction coefficient Kf, i.e., the value of the proportion of the normal correction amount Δ(N) to the difference between the value of the skin color representative point FP and the value of the ideal point IP, can be varied based on the color cast attributes. Furthermore, color balance correction is performed using an execution correction amount Δ(E) set based on the normal correction amount Δ(N). Therefore, in the image processing apparatus 100 of this embodiment, desirable color balance correction in accordance with the color cast attributes can be carried out.

In this embodiment, because the properties of each reference reduction coefficient Ks can be varied for each reference line SL, the value of the reference reduction coefficient Ks can be varied according to the direction of color cast even if the degree of color cast is the same. Because the reduction coefficient Kf is calculated using reference reduction coefficients Ks, the value of the reduction coefficient Kf can also be varied according to the direction of color cast. Therefore, in the image processing apparatus 100 of this embodiment, desirable color balance correction in accordance with the direction of color cast can be performed.

In this embodiment, because the value of the reference reduction coefficient Ks for one reference line SL can vary depending on the distance from the ideal point IP, the value of the reference reduction coefficient Ks can be varied in accordance with the degree of color cast. Because the reduction coefficient Kf is calculated using reference reduction coefficients Ks, the value of the reduction coefficient Kf can also be varied according to the degree of color cast. Therefore, in the image processing apparatus 100 of this embodiment, desirable color balance correction in accordance with the degree of color cast can be performed.

Furthermore in this embodiment, because the reduction coefficient Kf is calculated using preset reference reduction coefficients Ks, the reduction coefficient Kf can be easily calculated and the speed of processing can be increased. Furthermore, because the properties of the reduction coefficient Kf can be easily set in accordance with the color cast attributes, settings necessary for desirable color balance correction can be easily made.

B. Variations

The present invention is not limited to the embodiments and aspects described above. The present invention may be worked in various aspects within limits that involve no departure from the spirit of the invention; for example, the following variations are possible.

B1. Variation 1

In the above embodiment, the reduction coefficient Kf is calculated based on the post-conversion skin color representative value FVc and using reference reduction coefficients Ks, the relationship between the post-conversion skin color representative value FVc (or the skin color representative value FV) and the value of the reduction coefficient Kf may be calculated in advance and the calculated relationship may be stored as a table form. In this case, the speed of the color balance correction process can be increased.

B2. Variation 2

The method for calculating the reduction coefficient Kf using reference reduction coefficients Ks shown in the above embodiment is merely an example, and other methods may be used to calculate the reduction coefficient Kf using reference reduction coefficients Ks. For example, in the above embodiment, the reduction coefficient Kf is calculated using two of the six set reference reduction coefficients Ks, but the reduction coefficient Kf may be calculated using one reference reduction coefficient Ks or three or more reference reduction coefficients Ks. In the above embodiment, weighted averaging using the distances between the skin color representative point FP and reference color cast points SP is carried out when the reduction coefficient Kf is calculated, but weighted averaging using the distances between the skin color representative point FP and adoption reference points RP may be performed instead. Moreover, while six reference reduction coefficients Ks are used in the above embodiment, the number of reference reduction coefficients Ks may be freely set; It is acceptable to use five or fewer reference reduction coefficients Ks or seven or more reference reduction coefficients Ks.

In addition, the values of the reference reduction coefficients Ks used in the above embodiment are merely examples, the values of the reference reduction coefficients Ks may be set to different values. For example, in this embodiment, each reference reduction coefficient Ks is set to fall within the range of 0-0.8, but it may be set to a value that falls within the range of 0.1-1.0.

B3. Variation 3

In the above embodiment, the a*-b* plane is used as the plane in which hue and chroma are expressed, but the u*-v* plane or the like may alternatively be used as such plane.

B4. Variation 4

In the above embodiment, a face region is used as the human skin region expressed in the image, but a region other than the face may be used as the human skin region.

What is claimed is:

1. An image processing apparatus for executing color balance correction of an image composed of multiple pixels comprising:
   a representative value calculation unit that calculates, based on signal values of the pixels included in a skin tone area that includes pixels indicating human skin within the image, a representative value representing hue and chroma of the pixels included in the skin tone area; and
   a correction processor that executes color balance correction of the image using execution correction amount set based on normal correction amount obtained by multiplying a difference between the representative value and an ideal value designated as a value representing ideal hue and chroma of human skin by a reduction coefficient,
   wherein the value of the reduction coefficient is set such that the value of the reduction coefficient can vary in response to the representative value,
   wherein the representative value and the ideal value are values indicating positions on a plane that represents hue and chroma, and the difference between the representative value and the ideal value is a value indicating distance between the representative value and the ideal value on the plane, and
   wherein the reduction coefficient is set such that (i) the value thereof where the representative value is positioned at a first point on a first line traveling in a first direction from a position representing the ideal value on the plane is different from (ii) the value thereof where the representative value is positioned at a second point on a second line traveling in a second direction from the position representing the ideal value on the plane, a distance between the second point and the position representing the ideal value being equal to a distance between the first point and the position representing the ideal value.

2. An image processing method for executing color balance correction of an image composed of multiple pixels, the method comprising the steps of:
(a) calculating, based on signal values of the pixels included in a skin tone area that includes pixels indicating human skin within the image, a representative value representing hue and chroma of the pixels included in the skin tone area; and
(b) executing color balance correction of the image using execution correction amount set based on normal correction amount obtained by multiplying a difference between the representative value and an ideal value designated as a value representing ideal hue and chroma of human skin by a reduction coefficient,
wherein the value of the reduction coefficient is set such that the value of the reduction coefficient can vary in response to the representative value,
wherein the representative value and the ideal value are values indicating positions on a plane that represents hue and chroma, and the difference between the representative value and the ideal value is a value indicating distance between the representative value and the ideal value on the plane,
wherein the reduction coefficient is set such that (i) the value thereof where the representative value is positioned at a first point on a first line traveling in a first direction from a position representing the ideal value on the plane is different from (ii) the value thereof where the representative value is positioned at a second point on a second line traveling in a second direction from the position representing the ideal value on the plane, a distance between the second point and the position representing the ideal value being equal to a distance between the first point and the position representing the ideal value, and
wherein each of the steps of the image processing method for executing color balance correction of an image composed of multiple pixels is executed by a microprocessor.

3. A computer program product for executing color balance correction of an image composed of multiple pixels, the computer program product comprising:
a computer readable storage medium; and
a computer program stored on the computer readable storage medium, the computer program comprising:
a first program for calculating, based on signal values of the pixels included in a skin tone area that includes pixels indicating human skin within the image, a representative value representing hue and chroma of the pixels included in the skin tone area; and
a second program for executing color balance correction of the image using execution correction amount set based on normal correction amount obtained by multiplying a difference between the representative value and an ideal value designated as a value representing ideal hue and chroma of human skin by a reduction coefficient,
wherein the value of the reduction coefficient is set such that the value of the reduction coefficient can vary in response to the representative value,
wherein the representative value and the ideal value are values indicating positions on a plane that represents hue and chroma, and the difference between the representative value and the ideal value is a value indicating distance between the representative value and the ideal value on the plane, and
wherein the reduction coefficient is set such that (i) the value thereof where the representative value is positioned at a first point on a first line traveling in a first direction from a position representing the ideal value on the plane is different from (ii) the value thereof where the representative value is positioned at a second point on a second line traveling in a second direction from the position representing the ideal value on the plane, a distance between the second point and the position representing the ideal value being equal to a distance between the first point and the position representing the ideal value.

* * * * *